(12) United States Patent
Roshen et al.

(10) Patent No.: US 8,374,994 B2
(45) Date of Patent: Feb. 12, 2013

(54) SYSTEM AND METHOD OF QUANTUM COMPUTING USING THREE-STATE REPRESENTATION OF A QUBIT

(75) Inventors: Waseem Ahmed Roshen, Hilliard, OH (US); Sham Madhukar Vaidya, Troy, MI (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 12/619,210

(22) Filed: Nov. 16, 2009

(65) Prior Publication Data

US 2011/0114920 A1 May 19, 2011

(51) Int. Cl.
*G06F 15/00* (2006.01)
*G06F 15/18* (2006.01)

(52) U.S. Cl. .......................................................... 706/62
(58) Field of Classification Search .................. None
See application file for complete search history.

(56) References Cited

U.S. PATENT DOCUMENTS

| | | |
|---|---|---|
| 5,122,688 A | 6/1992 | Grimes |
| 5,610,537 A | 3/1997 | Hastings |
| 5,768,297 A | 6/1998 | Shor |
| 6,459,097 B1 | 10/2002 | Zagoskin |
| 6,943,368 B2 | 9/2005 | Amin et al. |
| 2008/0246638 A1 | 10/2008 | Haustein et al. |
| 2008/0291946 A1* | 11/2008 | Malinovsky ............. 372/8 |

OTHER PUBLICATIONS

Klimov, A. B. et al.; "Qutrit quantum computer with trapped ions"; 2003; The American Physical Society; Physical Review A 67, 062313; pp. 1-7.*
Burlakov A. V. et al.; "Measurement of Qutrits"; 2003; MAIK; Optics and Spetroscopy, vol. 94, No. 5; pp. 684-690.*
Grimes, DW, "Trinary Logic Circuits", Aug. 1998 IBM Technical Disclosure Bulletin, pp. 48-56. mhtml:file://C:\Documents and Seetings/Administrator\Liocal Seetings\Temp\notesC9812B\~7256221.mht.

* cited by examiner

*Primary Examiner* — David R Vincent
*Assistant Examiner* — Stanley K Hill
(74) *Attorney, Agent, or Firm* — John R. Pivnichny; McGinn IP Law Group, PLLC

(57) ABSTRACT

A method (and structure) of quantum computing. Two independent magnitudes of a three-state physical (quantum) system are set to simultaneously store two real, independent numbers as a qubit. The three-state physical (quantum) system has a first energy level, a second energy level, and a third energy level capable of being degenerate with respect to one another, thereby forming basis states for the qubit.

17 Claims, 4 Drawing Sheets

US 8,374,994 B2

SYSTEM AND METHOD OF QUANTUM COMPUTING USING THREE-STATE REPRESENTATION OF A QUBIT

BACKGROUND OF THE INVENTION

1. Field of the Invention

The present invention generally relates to a qubit (quantum bit). More specifically, a qubit is represented by a three-state physical system.

2. Description of the Related Art

The computing power of microprocessors has been doubling every 18 months over the last three decades. This doubling of power has been achieved by reducing the physical size of the basic computing unit, i.e., a transistor. Some of the dimensions of the transistor are currently approaching atomic sizes. At such small dimensions classical physics breaks down and this break down has resulted in a number of problems related to providing computing capability.

The most prevalent problem is the increase in the power requirements for the microprocessor due to a quantum mechanical effect called tunneling, which causes the loss of power. This problem of loss of power is expected to get worse as the dimensions of the transistor are further reduced.

Known Solution

In order to remediate the problem of the breakdown of classical physics at such small dimensions, which thereby translates to the consequent loss of power in a transistor, computers based on quantum physics have been proposed within the industry. Such computers are now known as "quantum computers".

Quantum computers employ non-intuitive properties of quantum physics. Such properties are not fully understood but can yield extremely powerful computers for the future. An example of such non-intuitive properties in quantum physics is superposition. The principle of superposition implies that a particle can be at two places at the same time. This is in contrast to classical physics, which limits a particle to one place at a given time.

Using this property, scientists have defined a basic computational quantity called the "qubit" (i.e., quantum bit). The qubit has the property that it can store two numbers at the same time, unlike a classical bit, which can store only one number at any given point in time. This property of storing two numbers at the same time in a qubit leads to extremely powerful computers in terms of speed, parallel processing, memory, and physical size of the computer.

It has been shown that these quantum computers can solve computationally complex problems, which are considered intractable using the conventional modern computers. An example of such computationally intensive problem is the factorization of a large number into its prime factors. Such a factorization problem is the key ingredient in encoding of the data for protection from unauthorized reading and use.

Issue Surrounding the Known Solution

Up to now, qubits have been represented by two-state physical systems. Examples of such two state physical systems are a nuclear spin of a hydrogen atom, a photon with two polarizations, a trapped neutral atom with two states, and a trapped ion with two states. In each of these two-state physical systems, the state can be represented as the superposition of the two states. In order to describe such a superposition state, two real numbers, one phase and one magnitude, are needed.

In other words, such a superposition state can store two numbers at the same time and thus represent a qubit.

However, in the conventional representations of a qubit, only one of these two numbers, the magnitude, can be read out easily. It is extremely difficult to read out the second number, namely the phase. Thus, in all of two-state systems studied so far, only in one system (e.g., the trapped ion) has there been demonstrated a control over both numbers. But in this system, scalability to computing devices containing more than two or three qubits has been a huge challenge.

Therefore, a need continues to exist for a design of a qubit having both the capability of storing two numbers and easily reading out two stored numbers while maintaining the property of scalability.

SUMMARY OF THE INVENTION

In view of the foregoing, and other, exemplary problems, drawbacks, and disadvantages of the conventional systems, it is an exemplary feature of the present invention to provide a structure (and method) in which a three-state system is employed to represent a qubit.

Such three-state physical system has two independent magnitudes that can represent a qubit. Since the magnitudes are related to probabilities for the system to be in one of the three possible states, they can easily be read out. In this scheme of physical representation of a qubit, the two independent phases of the three state systems are not used at all. Therefore, the question of not being able to read out information stored in such phases does not arise.

Therefore, in a first exemplary aspect of the present invention, to achieve the above features and objects, described herein is a method of quantum computing including setting two independent magnitudes of a three-state physical (quantum) system to simultaneously store two real, independent numbers, the three-state physical (quantum) system comprising a first energy level, a second energy level, and a third energy level capable of being degenerate with respect to one another, and thereby considered as forming basis states for the qubit.

In a second exemplary aspect of the present invention, also described herein is a quantum bit (qubit) simultaneously storing two real, independent numbers, the qubit comprising a three-state physical (quantum) system including a first energy level, a second energy level, and a third energy level, where the first energy level, the second energy level, and the third energy level are capable of being degenerate with respect to one another, the first energy level, second energy level, and third energy level are considered to form basis states for the qubit, and wherein two real, independent numbers of the qubit are stored as two independent magnitudes of the three-state physical (quantum) system and two independent phases of the three-state physical (quantum) system are not used for storing the two real, independent numbers of the qubit.

In a third exemplary aspect of the present invention, also described herein is a method of storing information into a qubit (quantum bit), including applying a radio frequency (RF) pulse having a pulse width predetermined to cause two magnitudes in a three-state physical system to simultaneously assume predetermined values due to a superposition effect in the three-state physical system, wherein the three-state physical system includes a first energy level, a second energy level, and a third energy level capable of being degenerate with respect to one another, thereby considered as forming basis states for the qubit.

In a fourth exemplary aspect of the present invention, also described herein is a method of reading information stored in a qubit, including transmitting radio frequency (RF) energy in a scanning manner over a predetermined RF frequency range to a sample of material having a three-state physical system; receiving a spectral response of the sample of material resultant from the scanning; and determining an information content of the sample of material from the received spectral response, wherein the three-state physical system includes a first energy level, a second energy level, and a third energy level capable of being degenerate with respect to one another, thereby considered as forming basis states for the qubit.

BRIEF DESCRIPTION OF THE DRAWINGS

The foregoing and other features, aspects and advantages will be better understood from the following detailed description of preferred embodiments of the invention, with reference to the drawings, in which.

DETAILED DESCRIPTION OF EXEMPLARY EMBODIMENTS OF THE INVENTION

Figure 1:
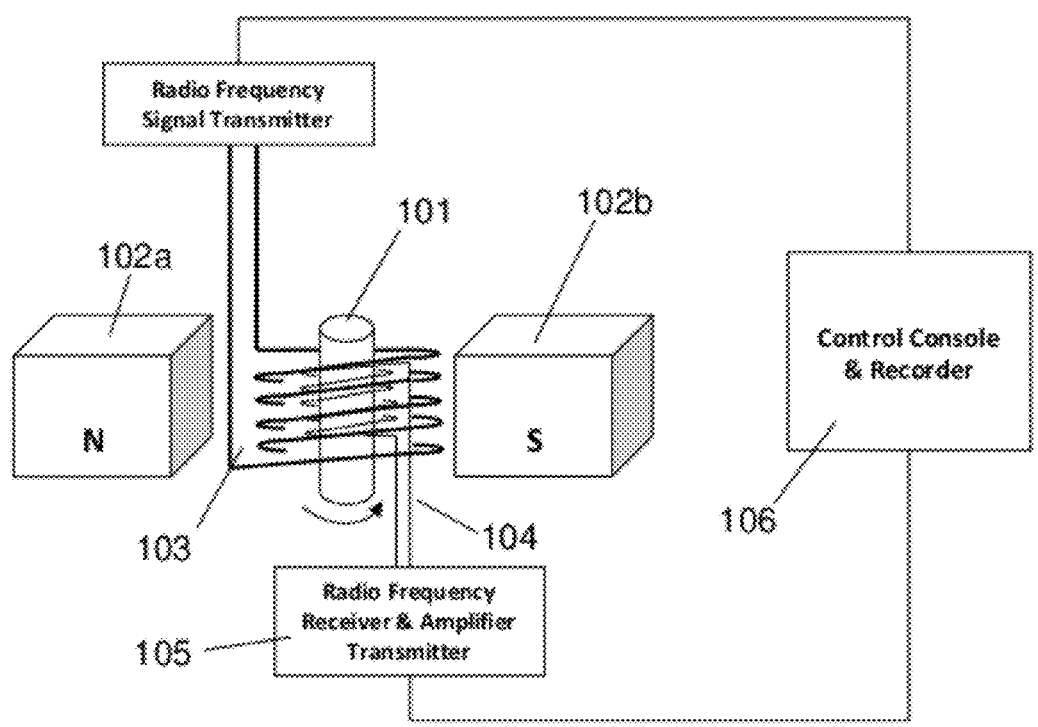
FIG. 1 shows a typical set up 100 for a continuous wave spectrometer that can be used to obtain the RF spectrum that shows two peaks of a three-state system.

Referring now to the drawings, and more particularly to FIGS. 1-7, exemplary embodiments of the method and structures according to the present invention will now be explained.

The following summarizes novelty of the present invention:

1. Three-state representation of a qubit in the certain way described above is new. Normally the qubit is represented by a two-state system. With this invention the qubit is represented as the combination of qubit and three-state.
2. Representing the qubit with a Spin S=1 system is new.
3. Representing the qubit with the nuclear spin of a Deuterium (D) atom is new.
4. Representing the qubit with the nuclear spin of either Copper (Cu), Silver (Ag), Gold (Au), Lithium (Li) or Nitrogen (N) atom is new. All these nuclei have a spin S=1.
5. Use of NMR (Nuclear Magnetic Resonance) to make measurements of the numbers stored in the nuclear spin of the Deuterium, Copper, Silver, Gold, Lithium or Nitrogen (N) atom is new (for purpose of representing a qubit).
6. Use of three-state atom as representing a qubit is new.
7. Use of three-state atoms such as Boron (B), Aluminum (Al), Gallium (Ga), Indium (In) or Thalium (Tl) to represent a qubit is new.
8. Use of atomic spectroscopy, in particular absorption atomic spectroscopy, to measure the two numbers stored in a three-state atom or ion is new.
9. Use of a three-state ion as representing a qubit is new. Examples of such ions include $C^{+1}$, $Si^{+1}$, $Ge^{+1}$, $Sn^{+1}$, and $Pb^{+1}$.

No alternate known solutions exist at this point in time.

An "atom" or "ion", in the context of describing the present invention, means a sample of that material containing atoms or ions that are substantially identical for so that a substantially uniform measurement of a sample theoretically represents the measurement of a single atom or ion. Currently, sample with atoms or ions can be prepared in identical states only at very low temperatures. The actual number of atoms or ions necessary to measurably achieve described effects is expected to become smaller over time, including an ultimate possibility of being able to utilize a single atom or ion to represent a qubit, similar to the concept that transistor technology is approaching the theoretical limit of using a single atom or molecule.

As summarized above, according to the present invention, a qubit will be represented by a three-physical-state system. In such a three-state system, the general state of the system can be specified by specifying two independent magnitudes and two independent phases.

In the solution described in this disclosure, the two independent phases would not be used for storing or retrieving information. The two independent magnitudes are enough to represent a qubit. These two independent magnitudes are easy to read out since they correspond to probabilities of the system being in one of the three possible states. In other words, they correspond to the classical variables.

The present invention can be implemented in a number of different ways. Some of the three physical state systems that can be used are:

1. A nuclear spin with a spin value of 1;
2. An atom or a molecule with three possible physical states; and
3. An ion with three possible physical states.

A concrete example of a nuclear spin with a spin value of 1 is the Deuterium nucleus. Deuterium is an isotope of Hydrogen and its nucleus consists of a proton and a neutron. Both the proton and neutron have a spin of ½, producing a net spin of 1 for the nucleus. Such a nuclear spin has three states, commonly represented by 1, 0, −1.

In order to read out the stored numbers, standard NMR (Nuclear Magnetic Resonance) techniques can be employed. First, a static magnetic field is applied. This magnetic field splits the three states into three different energy states. After applying the static magnetic field, a radio frequency field is applied with a variable frequency so as to scan across a predetermined frequency range. This application of the radio frequency field will show two peaks at two different energies (or frequencies). From the heights of the two peaks, the two stored numbers can be easily obtained.

The simplest method of obtaining the spectrum is referred to as the continuous wave (CW) method. A typical CW-spectrometer is shown in the FIG. 1. A solution of the sample in a uniform 5 mm glass tube is oriented between the poles of a powerful magnet, and is spun to average any magnetic field variations, as well as tube imperfections. Radio frequency (rf) radiation of appropriate energy is broadcast into the sample from an antenna coil 103. A receiver coil 104 surrounds the sample tube, and emission of absorbed rf energy is monitored by dedicated electronic devices 105, 106, that could include a computer with control instructions for the transmission and reception of rf signals. An NMR spectrum is acquired by varying or sweeping the magnetic field over a small range while observing the rf signal from the sample. An equally effective technique is to vary the frequency of the rf radiation while holding the external field constant.

Similar techniques are also available for other three state systems such as a three-state atom/molecule or a three-state ion. For example, in case of atoms, atomic spectroscopy can be employed to observe the absorption peaks. A particular form of atomic spectroscopy is called absortion spectroscopy.

Figure 2:
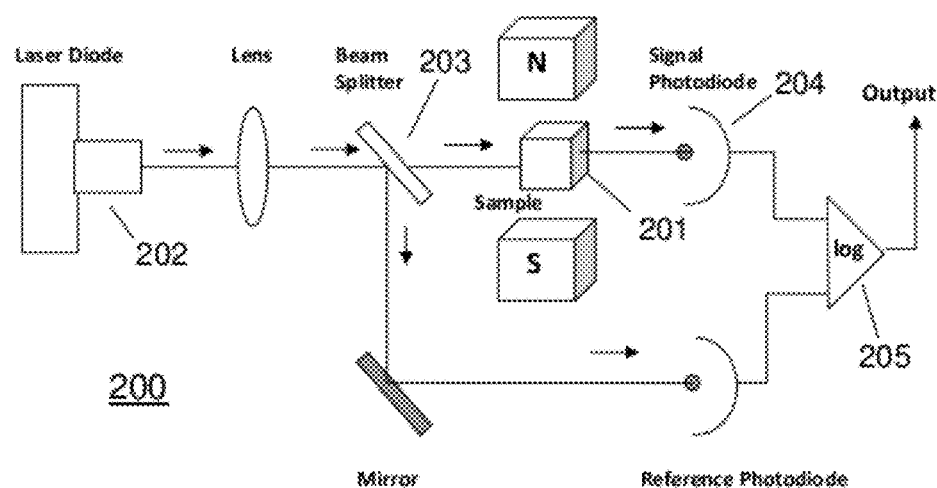
FIG. 2 shows a typical set up 200 for obtaining an absorption spectrum of a three-state system.

As exemplarily demonstrated by the experimental setup 200 shown in FIG. 2, absorption spectroscopy is a technique in which the power of a beam of light measured before and after interaction with a sample 201 is compared. When performed with a tunable laser diode 202 as a source of light, it is often referred to as Tunable Diode Laser Absortion Spectrocopy (TDLAS).

In FIG. 2, a light beam from a laser diode 202 is first focused at a splitter (half-silvered minor) 203, which splits the beam into two parts. The first part of the light bean is passed through the sample 201 on in its way to a signal photo diode 204. The sample 201 absorbs some of the light. The second part of the light beam is used as a reference for comparison purposes. The two parts of the beam is fed into a log device 205 as two inputs, which performs the comparison and produces an absorption spectrum.

Storing Information

Figure 3:
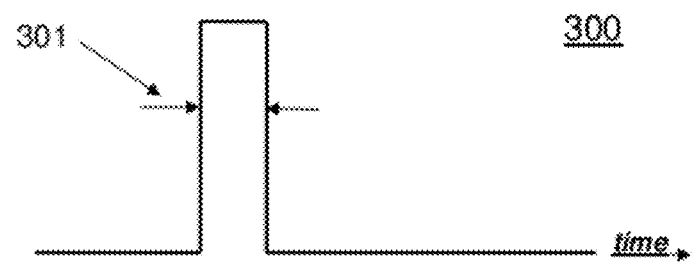
FIG. 3 shows a typical waveform 300 as would be used for storing information into a three-state system.
Figure 4:
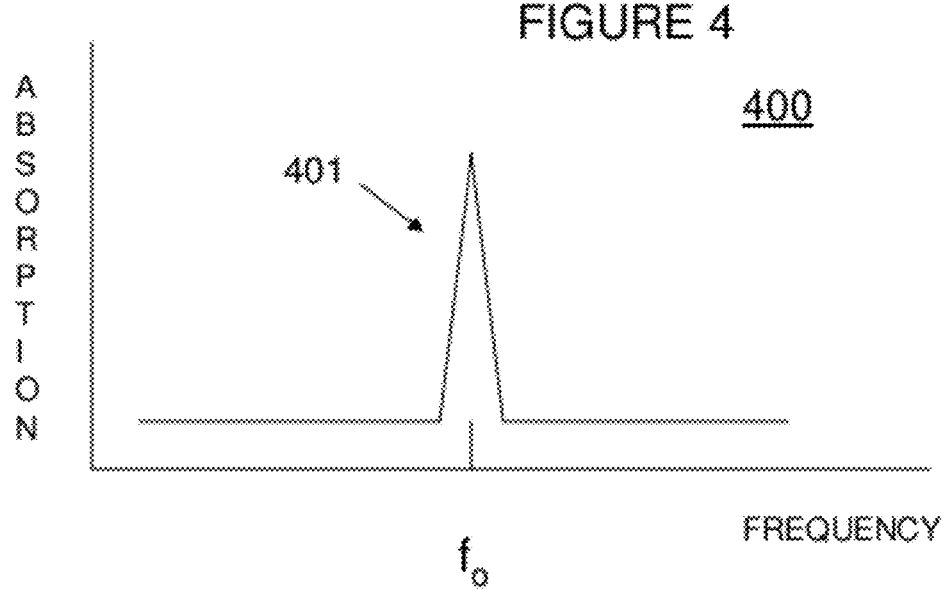
FIG. 4 shows an exemplary absorption spectrum 400 having a single absorption peak 401, for a two-state system.

In the exemplary nuclear Spin S=1 three-state system, the two numbers can be stored by preparing the superposition state, which corresponds to the two numbers of the qubit. This state preparation of the state requires the following two steps:
1. First, a static magnetic field is applied, which will align the nuclear Spin S parallel to the magnetic field.
2. Second, an RF (radio frequency) pulse of for a short duration is applied, as shown in FIG. 3. This application of the RF pulse 301 will rotate the nuclear spin. The resulting final state, in general, will be a superposition of the three state levels of the nuclear Spin S=1. A specific superposition state can be generated by controlling the width of the RF pulse, thereby setting the system to simultaneously store two numbers, as further explained below.

Determination (Roshen-Vaidya) Test for a Three State System Presence for the New Solution Summary of Test There is one test which can be used to determine if the three-state system is being used instead of a two-state system to represent a qubit. In this method, first, one applies a small static magnetic field which splits the states into separate energy states. Then, one applies a time-varying electromagnetic wave signal whose frequency can be varied.

Figure 5:
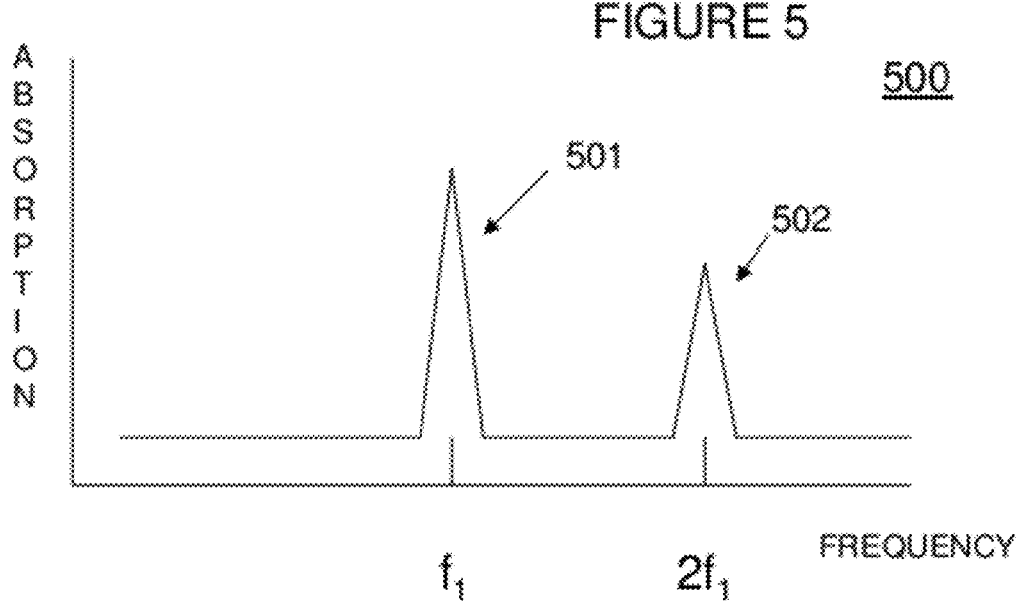
FIG. 5 exemplarily shows an absorption spectrum 500 having the two peaks 501, 502 of a three-state system, as used in the present invention.

In case of two-state system the electromagnetic wave shows a single absorption peak (see FIG. 4), while in case of a three-state system, two peaks at two different frequencies are observed in the absorption spectrum (see FIG. 5). Thus, this test is clearly able to distinguish between two- and three-state representations of qubits.

New Solution—Details of the Test

Figure 6:
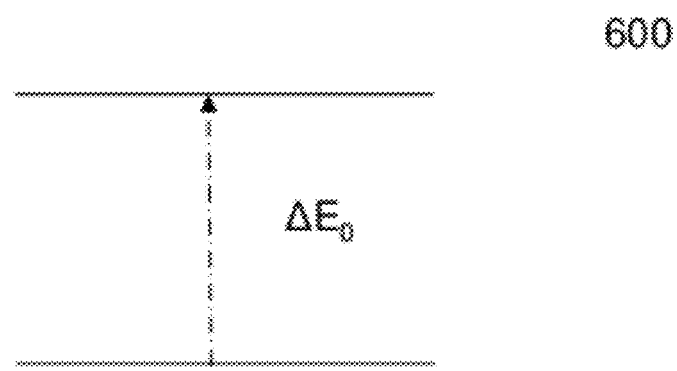
FIG. 6 exemplarily shows the two-energy split 600 of a two-state system when a small static magnetic field is applied.
Figure 7:
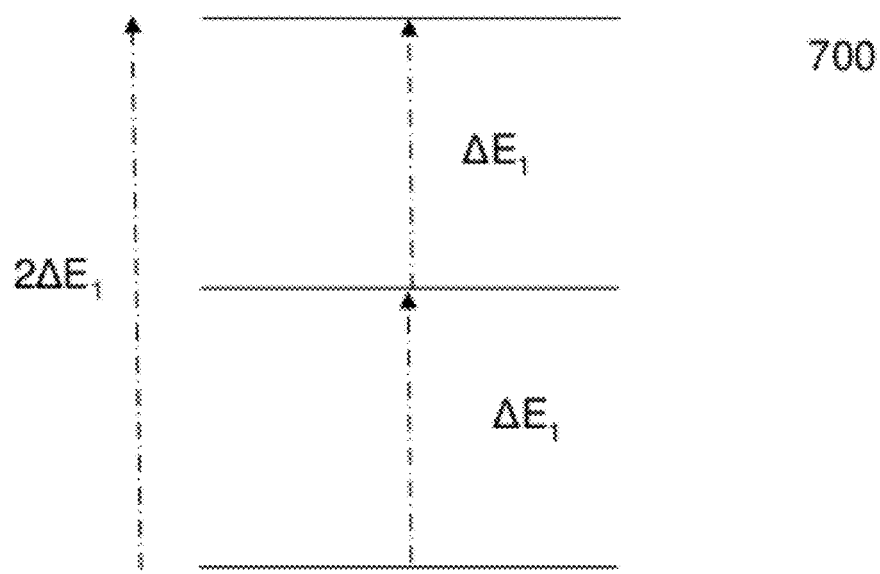
FIG. 7 exemplarily shows the three-energy split 700 of a three-state system upon application of a small static magnetic field.

The following steps are involved in this test:
1. First one applies a small static magnetic field. The result of the application of this magnetic field is that the states, which are equal in energy in the absence of the magnetic field, are split in energy. For example in the case of two-states, the situation is shown in FIG. 6, which shows two states being split in energy by an amount $\Delta E_o$. Similarly, in the case of three-state system the three states split into three energy levels as shown in FIG. 7.
2. In the second step, a variable-frequency electromagnetic wave is applied to the system and the absorption of the electromagnetic waves by the system is monitored. This absorption of the electromagnetic occurs because the system is able to make a transition from a lower energy state to a higher energy state. The outcome of absorption monitoring is different for the two state systems and the three state systems:
   In the case of two-state system only one absorption peak is observed as shown in the FIG. 4. This is made clear by considering FIG. 6, which shows this transition by a dotted arrow. It is clear from FIG. 6 that only one transition from lower energy state to higher energy state is possible.
   In the case of three state systems two distinct absorption peaks are observed as shown in FIG. 5. This observation of two peaks can be explained on the bases of FIG. 7, which shows that there are three energy states. In principle three absorption peaks should be observed, however, two of these two peaks occurs at the same frequency because the change (delta) of energies for these two transitions are equal. Thus two of the three peaks superimpose on each other and only two distinct peaks are observed.

The Present Invention Compared with Previous Qubit Representations

There are two other previously known three-state related quantities. These older quantities are separate and distinguishable from the new Qubit with three-state representation that is presented in the present invention. For clarity purpose, we will refer to the new Qubit with three state representation as WS-Qubit.

The following table summarizes the differences of this new WS-Qubit with the two other previously known three-state related quantities. Please note the words "and" and "or" in the second column. Which of these two words is used makes a big difference in terms of how many total numbers can be stored at a given time as shown in the third column.

The comparison of the entries in the second and third columns shows that WS-Qubit is clearly different and distinguishable from the two previously known, three-state quantities, namely Trit and Qutrit.

| Quantity | Possible numbers can be stored | Total numbers stored at a given time |
| --- | --- | --- |
| WS-Qubit: Qubit with three-state representation | 0 and 1 0,1 or 2 | 2 1 |
| Classical Tri-state bit (a.k.a Trit) | | |
| Qutrit (Quantum tri-state quantity) | 0, 1, 3, and 4 (possibly more) | 4 |

Amin et al. have previously considered three-state systems for building quantum gates, which are needed for quantum logic. However, their qubit representation employs only two out of three states. They represent the qubit in the conventional way by using the superposition of these two states as:

$$|\psi\rangle = \alpha|0\rangle + \beta|1\rangle$$

where $|0\rangle$ and $|1\rangle$ are the two degenerate states and $\alpha$ and $\beta$ are called probability amplitudes. $\alpha$ and $\beta$ are both complex numbers, each one having a magnitude (a real number) and a phase (also a real number). The two magnitudes $|\alpha|$ and $|\beta|$ are related by the following normalization condition:

$$|\alpha|^2 + |\beta|^2 = 1$$

This normalization condition means that only one of these two magnitudes is independent and one is forced to use one of the phases (the relative phase) to fully represent the two numbers of the qubit.

In contrast to what is described in Amin et al.'s patent, the present invention uses three states to represent the qubit as follows:

$$|\psi\rangle = \alpha|0\rangle + \beta|1\rangle + \gamma|2\rangle$$

where $\alpha$, $\beta$, and $\gamma$ are three probability amplitudes and $|0\rangle$, $|1\rangle$, and $|2\rangle$ are the three degenerate states of a three-state system. $\alpha$, $\beta$, and $\gamma$ are three complex numbers called probability amplitudes for the three-state systems. Each of these three complex numbers has a magnitude (a real number) and a phase (also a real number). The magnitudes are related by the following normalization condition:

$$|\alpha|^2 + |\beta|^2 + |\gamma|^2 = 1$$

This normalization condition means that for the three-state representation two independent magnitudes are available to represent two numbers of a qubit. In the present invention we use only these two independent magnitudes as representing the two numbers of a qubit. In view of the above descriptions of the comparisons of the conventional concepts and implementations of a "qubit", the present invention could also appropriately be described as providing a "modified qubit" relative to qubits currently known in the art.

From the foregoing description, it should be clear to one having ordinary skill in the art that the present invention would make it easy to retrieve the information stored in a qubit. More specifically, it will allow both of the numbers stored to be measured and retrieved with ease. The present invention also describes new methods for retrieving the information stored in this new qubit, such as NMR spectroscopy and atomic spectroscopy. The present invention also introduces a new concept of using three-state systems that can be used to represent a qubit. These new three-state systems include nuclear spins each having a value of 1 and many more there-state atoms and ions.

It is expected that use of these three-state systems would accelerate the development of practical quantum computers. Quantum computers have enormous power in terms of speed, memory, and size compared to modern computers which are based on classical physics.

While the invention has been described in terms of exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method comprising:
    setting two independent magnitudes of a three-state quantum system to simultaneously store two real, independent numbers as a qubit,
    said three-state quantum system comprising a first energy level, a second energy level, and a third energy level capable of being degenerate with respect to one another and thereby considered as forming basis states for said qubit.

2. The method of claim 1, wherein two independent phases of the three-state quantum system are not used for storing the two real, independent numbers of the qubit.

3. The method of claim 2, further comprising:
    measuring stores values of said two independent magnitudes, thereby determining said two number being simultaneously stored in said qubit.

4. The method of claim 1, wherein said three-state quantum system comprises a nuclear spin with a spin value of 1.

5. The method of claim 4, wherein said nuclear spin belongs to an atom, which comprises a part of a molecule.

6. The method of claim 5, wherein said atom or said molecule is dissolved in a liquid or a liquid-crystal.

7. The method of claim 5, wherein said atom or said molecule is in a form of a gas.

8. The method of claim 5, wherein said atom or said molecule is in a form of a liquid.

9. The method of claim 5, wherein said atom or said molecule is in a form of a solid.

10. The method of claim 4, wherein said three-state quantum system comprises a Deuterium nucleus, having a proton and a neutron, both the proton and neutron having a spin of ½, producing a net spin of one 1 for the Deuterium nucleus, the nuclear spin thereby having three states, represented as 1, 0, −1.

11. The method of claim 4, wherein said three-state quantum system comprises a nucleus of an atom of one of: Copper (Cu); Silver (Ag); Gold (Au); Lithium (Li); and Nitrogen (N).

12. The method of claim 1, wherein said three-state quantum system comprises an atom or a molecule with three-physical states.

13. The method of claim 12, wherein said three-state quantum system comprises a three-state atom, comprising one of: Boron (B); Aluminum (Al); Gallium (Ga); Indium (In); and Thalium (Tl).

14. The method of claim 1, wherein said three-state quantum system comprises an ion with three-physical states.

15. The method of claim 14, wherein said three-state quantum system comprising a three-state ion comprises one of: $C^{+1}$, $Si^{+1}$, $Ge^{+1}$, $Sn^{+1}$, and $Pb^{+1}$.

16. A quantum bit (qubit) simultaneously storing two real, independent numbers, said qubit comprising:
    a three-state quantum system including a first energy level, a second energy level, and a third energy level, said first energy level, said second energy level, and said third energy level capable of being degenerate with respect to one another, said first energy level, said second energy level, and said third energy level considered to form basis states for said qubit,
    wherein two real, independent numbers of said qubit are stored as two independent magnitudes of said three-state quantum system and two independent phases of the three-state quantum system are not used for storing the two real, independent numbers of the qubit.

17. The qubit of claim 16, wherein said two independent magnitudes correspond to heights of two peaks in a frequency spectrum of said three-state quantum system.

* * * * *